(12) United States Patent
Dorenbosch et al.

(10) Patent No.: US 7,535,857 B2
(45) Date of Patent: May 19, 2009

(54) METHOD FOR TRANSMITTING DATA FROM A PARTICIPANT DEVICE IN A SESSION IN AN INTERNET PROTOCOL (IP) SYSTEM

(75) Inventors: Jheroen P. Dorenbosch, Paradise, TX (US); Anatoly Agulnik, Buffalo Grove, IL (US); Janus P. Burks, Richland Hills, TX (US); Peter M. Drozt, Prairie Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 523 days.

(21) Appl. No.: 11/282,337

(22) Filed: Nov. 18, 2005

(65) Prior Publication Data

US 2007/0115961 A1    May 24, 2007

(51) Int. Cl.
*H04L 12/28* (2006.01)
(52) U.S. Cl. .................. 370/261; 370/389; 370/410; 709/204
(58) Field of Classification Search ............ None
See application file for complete search history.

(56) References Cited

U.S. PATENT DOCUMENTS

| | | | |
|---|---|---|---|
| 5,928,331 A * | 7/1999 | Bushmitch ............ 709/231 |
| 6,141,347 A | 10/2000 | Shaughnessy et al. |
| 7,016,339 B1 * | 3/2006 | Naudus et al. ............ 370/352 |
| 2001/0012296 A1 | 8/2001 | Burgess et al. |
| 2002/0010917 A1 * | 1/2002 | Srikantan et al. ............ 725/1 |
| 2002/0033880 A1 * | 3/2002 | Sul et al. .............. 348/14.09 |
| 2003/0003938 A1 * | 1/2003 | O'Neill et al. ............ 455/519 |
| 2003/0073453 A1 | 4/2003 | Basilier |
| 2005/0002402 A1 | 1/2005 | Fairman |
| 2005/0094557 A1 * | 5/2005 | Chen et al. ............. 370/229 |
| 2007/0168523 A1 * | 7/2007 | Jiang et al. ............. 709/228 |

* cited by examiner

*Primary Examiner*—Wing F Chan
*Assistant Examiner*—Brian Roberts

(57) ABSTRACT

A method for transmitting data from a participant device in a session in an Internet Protocol (IP) system (100) is provided. The method comprises sending (405) one or more a first Real-time Transport Protocol (RTP) packet of the session to a first address. The method further comprises sending (410) one or more a first Real-time Transport Control Protocol (RTCP) packet of the session to a second address. The participant device sends the one or more a first RTP packet and the one or more a first RTCP packet.

25 Claims, 6 Drawing Sheets

US 7,535,857 B2

METHOD FOR TRANSMITTING DATA FROM A PARTICIPANT DEVICE IN A SESSION IN AN INTERNET PROTOCOL (IP) SYSTEM

FIELD OF THE INVENTION

The invention relates generally to an Internet Protocol (IP) system. More specifically, the invention relates to a method for transmitting data in a session in an IP system.

BACKGROUND OF THE INVENTION

In the existing IP systems, Real-time Transport Protocol (RTP) packets are used for voice bearer distribution and Real-time Transport Control Protocol (RTCP) packets are used for bearer quality monitoring, session control and distribution of participant device information in conference calls and in dispatch sessions. Each participant device uses a single IP address for sending the RTP packets and the RTCP packets. As a result, both the RTP packets and the RTCP packets are sent at a single destination. However, one of the RTP packets and the RTCP packets may not be useful for the single destination. For example, an RTP packet may not be useful for an application controller of the IP system. Similarly, an RTCP packet may not be useful for a bearer replicator of the IP system. As a consequence of using a single IP address for both the RTP packets and the RTCP packets, an unnecessarily high load on the controller receiving these packets may be created.

BRIEF DESCRIPTION OF THE FIGURES

The accompanying figures, where like reference numerals refer to identical or functionally similar elements throughout the separate views and together with the detailed description below are incorporated in and form part of the specification, serve to further illustrate various embodiments and to explain various principles and advantages all in accordance with the invention.

Figure 1:
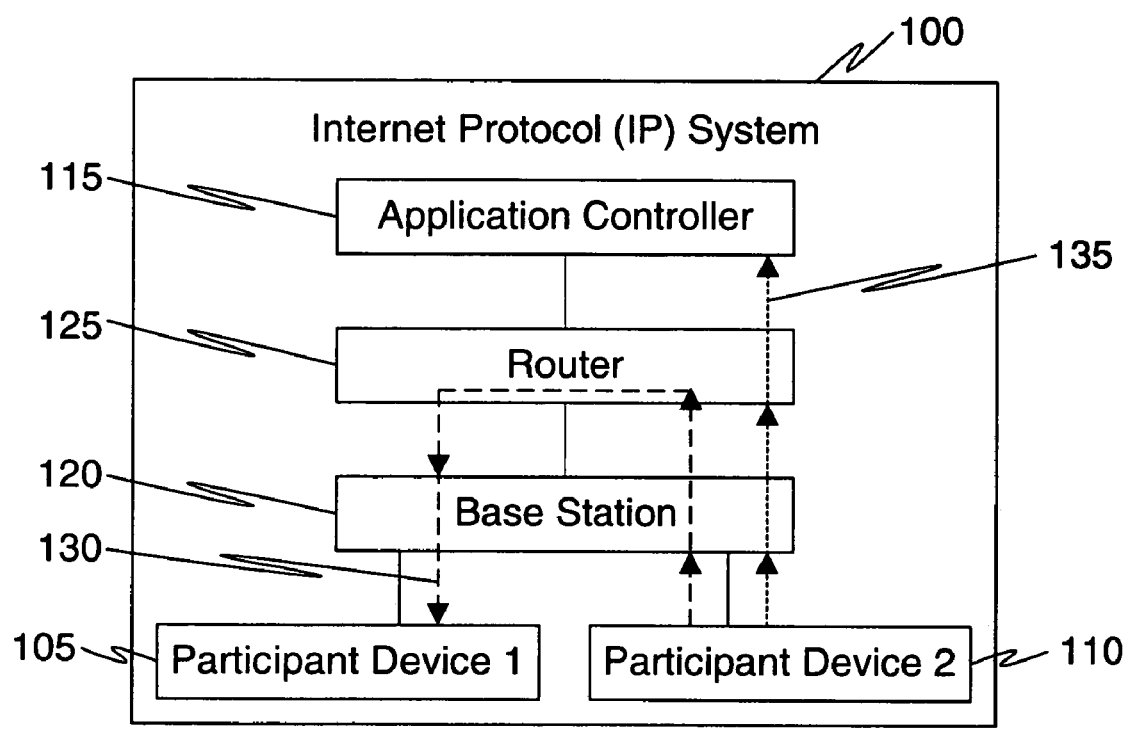
FIG. 1 is a block diagram of an Internet Protocol (IP) system, in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to transmitting data from a participant device in a session in an Internet Protocol (IP) system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the IP system described herein. The non-processor circuits may include, but are not limited to, a radio receiver, a radio transmitter, signal drivers, clock circuits, power source circuits, and user input devices. As such, these functions may be interpreted as steps of a method for transmitting data from a participant device in a session in an IP system. Alternatively, some or all functions could be implemented by a state machine that has no stored program instructions, or in one or more Application Specific Integrated Circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Various embodiments of the invention provide a method for transmitting data from a participant device. The participant device is a device that participates in a session in an IP system, such as a conference call or a dispatch session, with one or more other participant devices. The participant devices may be mobile or fixed and may be connected via a wired or a wireless means to the IP system. The invention addresses the problem of providing a copy of the bearer sent by one of the participant devices to all other participant devices, while at the same time efficiently routing session control messages such as talker arbitration messages and messages related to the quality of service (QoS). The IP system uses RTP packets for the bearer and RTCP packets for control and QoS messages. The method of the invention comprises sending one or more first Real-time Transport Protocol (RTP) packets of the session to a first address. The method further comprises sending one or more first Real-time Transport Control Protocol (RTCP) packets of the session to a second address. The participant device sends the one or more first RTP packets and the one or more first RTCP packets. RTP packets are used for bearer distribution and RTCP packets are used for bearer quality monitoring, session control and distribution of participant device information.

FIG. 1 is a block diagram of an IP system 100, in accordance with an embodiment of the invention. The IP system 100 comprises a participant device 105, a participant device 110, an application controller 115, a base station 120 that is used for wireless communication, and a router 125. In another embodiment of the invention, a plurality of the routers and a plurality of the base stations may be used if the participant devices that are used in the dispatch call are not present at the same site.

Figure 2:
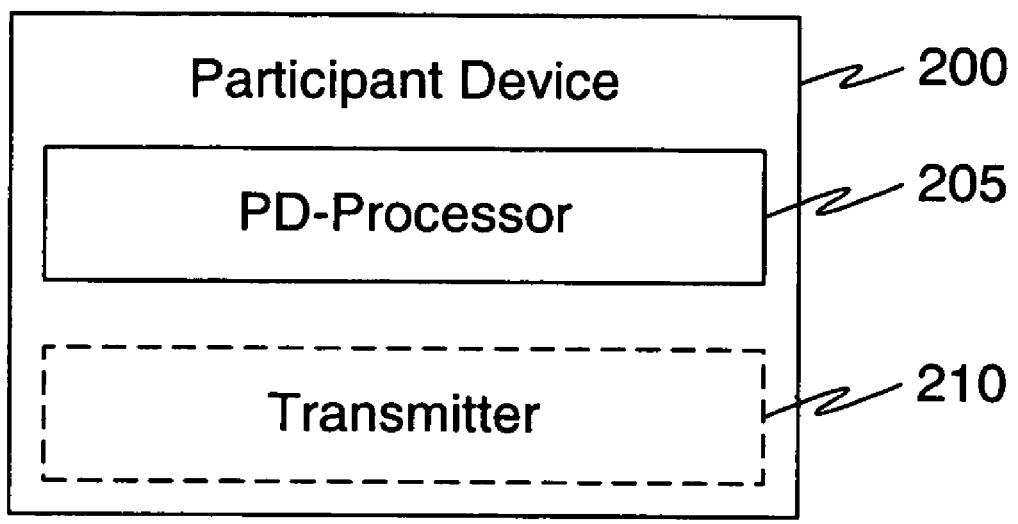
FIG. 2 is a block diagram of a participant device, in accordance with an embodiment of the invention.

The participant device 105 and the participant device 110 participate in a call, which may be a dispatch call or a conference call, and these devices are explained in detail in conjunction with FIG. 2. An efficient way to provide copies of the bearer to all participant devices is to use IP multicast to distribute the bearer packets. The plurality of participant devices each host the same multicast address so that any packet sent to that multicast address will be received by the participant devices having that multicast address. In an embodiment where the participant devices 105 and 110 host such a multicast address, the participant device 110 sends an RTP packet 130 to the base station 120 which is then forwarded to the router 125 using a first destination address which is the multicast address hosted by the plurality of participant devices. An RTP packet generally refers to a packet formed and used according to an IP protocol that supports real-time transmission of voice, music and/or video. The router 125 sends the multicast RTP packet 130 to the other participant device 105. The router 125 may send the multicast RTP packet 130 to a plurality of participant devices participating in the call. The participant device 110 further sends a unicast RTCP packet 135 such as an arbitration message to the base station 120, and the base station 120 forwards the RTCP packet 135 to the router 125. The router 125 sends the RTCP packet 135 to the application controller 115 using a second address. The application controller 115 is explained in detail in conjunction with FIG. 3. An RTCP packet generally refers to a companion protocol to RTP that is used to monitor quality of service.

During a dispatch call, the unicast RTCP packet 135 may be a request for the floor to be granted to a participant device, such as participant device 110. The application controller 115 then sends a downlink talker arbitration message to the router 125 for distribution to one or more of the participant devices 105 and 110. The downlink talker arbitration messages may be a response to the request for the floor to be granted to the participant device 110. The floor may be granted to the participant device 110 only if the floor is idle at the time of the request and the floor is not granted to the participant device 110 if the floor is not idle. The router 125 forwards the talker arbitration messages, which are provided to it by the application controller 115, to the base station 120. In the case of a wireless system, the base station 120 then forwards the talker arbitration message stating that the floor is granted to the participant device 110. The base station 120 further forwards the talker arbitration message to the participant device 105 stating that the floor is taken by the participant device 110.

FIG. 2 is a block diagram of a participant device 200, in accordance with an embodiment of the invention. The participant device 200 comprises a PD-processor 205. The PD-processor 205 is configured to send one or more first RTP packets of a session to a first address and to send one or more first RTCP packets of the session to a second address. The first address may be a unicast address. Alternatively the first address could also be a multicast address. The PD-processor 205 may be further configured to receive the first address and the second address in a Session Initiation Protocol (SIP) message.

In an embodiment of the invention, the participant device 200 may be a mobile station and can comprise a transmitter 210. The transmitter 210 is adaptively coupled with the PD-processor 205. In another embodiment of the invention, the participant device 200 may be a mobile device (for example, a laptop) that may connect to the IP system 100 using a wired connection. In yet another embodiment of the invention, the participant device 200 may be a fixed device (for example, a desktop computer).

Figure 3:
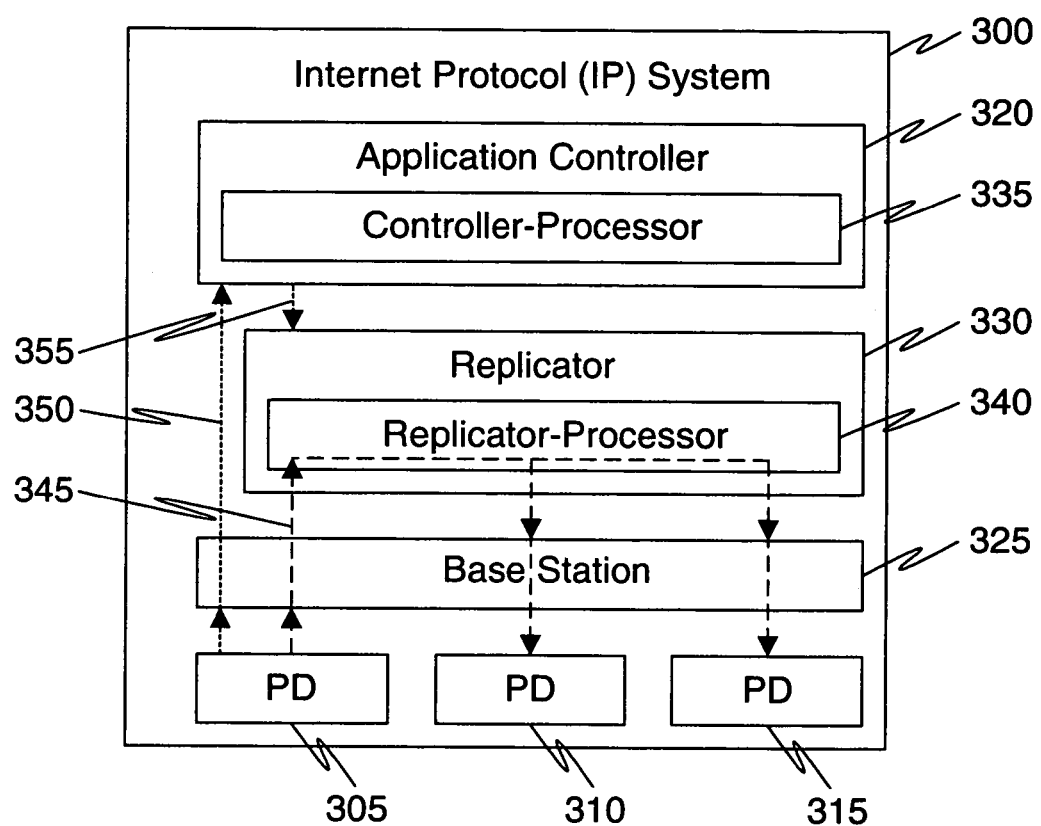
FIG. 3 is a block diagram of an IP system, in accordance with another embodiment of the invention.

FIG. 3 is a block diagram of an IP system 300, in accordance with another embodiment of the invention. The IP system 300 comprises one or more participant devices (for example, a participant device 305, a participant device 310 and a participant device 315), an application controller 320, a base station 325 and a replicator 330.

The participant devices (PDs) 305, 310, and 315 are similar to the participant device 200 as explained in conjunction with FIG. 2. The participant devices 305, 310, and 315 are in a network participating in a dispatch call. In an embodiment of the invention, the participant device 305 sends an uplink RTP packet 345 to the replicator 330 and an RTCP packet 350 (comprising at least one arbitration message) to the application controller 320 (via the base station 325). The application controller 320 hosts the second address because the application controller 320 uses the RTCP packet 350 for session control and distribution of participant device information. The application controller 320 comprises a controller-processor 335. The controller-processor 335 is configured to send the one or more downlink talker arbitration messages 355 to the replicator 330. The replicator 330 replicates and forwards the downlink talker arbitration messages 355 to the first address to be received by each of the participant devices. Also, the replicator 330 replicates the uplink RTP packet 345 sent by the participant device 305 and forwards the replicated RTP packet 345 to the participant device 310 and 315.

Further, the application controller 320 may be in communication with the base station 325, when each participant device is a mobile station. The controller-processor 335 is configured to send the downlink talker arbitration messages 355 for the participant devices to the first address which is unicast and hosted by the replicator 330. In an embodiment of the invention, the controller-processor 335 is further configured to specify the first address and the second address to the participant devices.

In an embodiment of the invention, the first address may be a unicast address. In another embodiment of the invention, the first address may be a multicast address. In this embodiment of the invention, the replicator 330 hosts the first address. The replicator 330 comprises a replicator-processor 340. The replicator-processor 340 is configured to receive a plurality of uplink packets for a session from the participant device 305 and a plurality of downlink talker arbitration messages 355 for the session from the application controller 320. The plurality of uplink packets comprises one or more first uplink RTP packets 345. In an embodiment of the invention, the plurality of uplink packets further comprises one or more first RTCP packets 350. Further, the replicator-processor 340 may be configured to forward a copy of the first uplink RTCP packets 350 used for talker arbitration to the application controller 320. In one embodiment, the replicator 330 could forward the talker arbitration message as it was received. Alternatively, the replicator 330 creates an entirely different message to be sent to the application controller 320. The replicator-processor 340 is further configured to replicate the first uplink RTP packets 345 and the downlink RTCP packets 350 so that other devices can obtain the uplink RTP packets 345 and the downlink RTCP packets 350 used for arbitration.

Those of ordinarily skill in the art will appreciate that there can be other devices in the IP system 300. However, these devices are not disclosed, as they are not necessary for the understanding of the invention by one of ordinary skill in the art.

Figure 4:
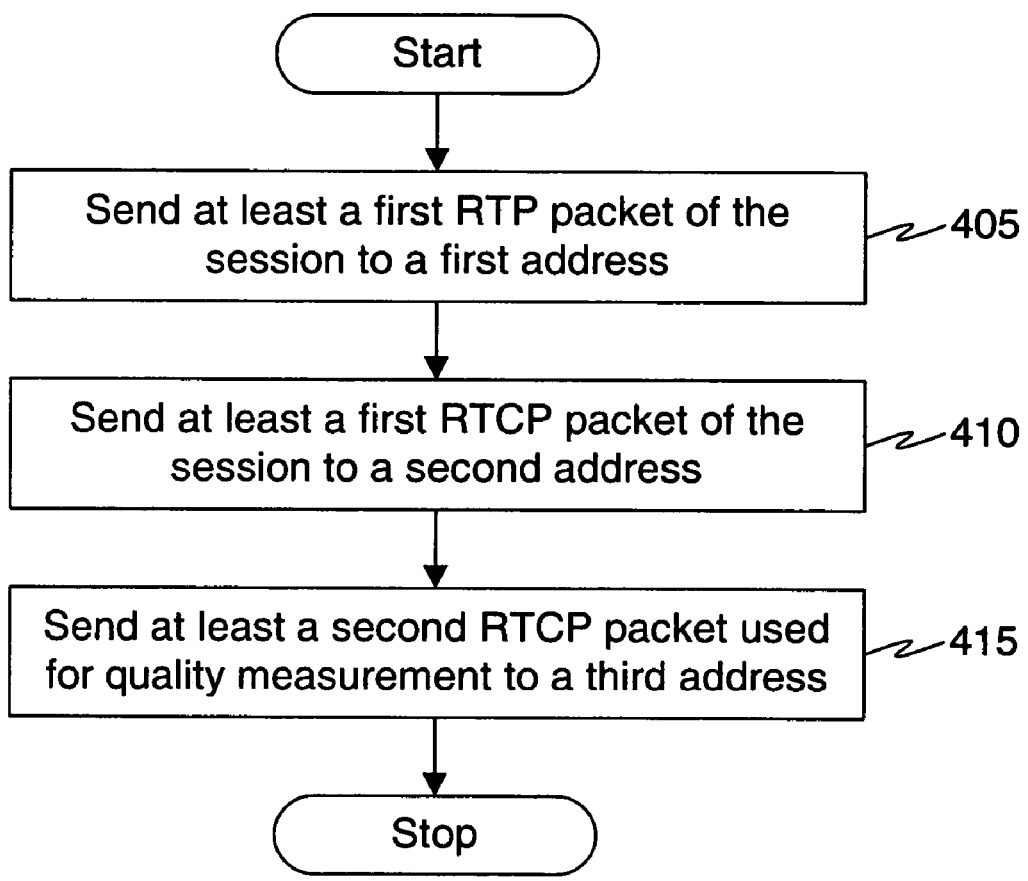
FIG. 4 is a flow diagram of a method for transmitting data from a participant device in a session in an IP system, in accordance with an embodiment of the invention.

FIG. 4 is a flow diagram of a method for transmitting data from the participant device 305 in a session in the IP system 300, in accordance with an embodiment of the invention. At step 405, the participant device 305 sends the first RTP packets of the session to a first address. In an embodiment of the invention, the first address is a bearer replicator unicast address. The bearer replicator receives and replicates the RTP packet to make the RTP packet available to other participant devices in the session. In another embodiment of the invention, the first address is a transcoder unicast address. The transcoder converts the packet from one bearer format to another bearer format. The first address can also be a multicast address. In addition, the participant device can send RTP packets directly to every other participant. One or more participant devices in the session receive the bearer, for example as voice or video, sent by the participant device 305.

At step 410, the participant device 305 sends the first RTCP packets of the session to a second address. This is further explained in conjunction with FIG. 5. In an embodiment of the invention, the second address can be a unicast address of an application controller 320, which could be dispatch server, a voice conference controller, a videoconference controller or something similar. The address can also be a multicast address. The RTCP packets can include session identification information such that the IP system 300 and its components thereof may determine that the RTP packets and RTCP packets are belonging to the session. Optionally, at step 415, the participant device 305 sends the second RTCP packets of the session used to a third address. The third address can be used for the quality measurement reports of the session. Alternatively, the second RTCP packets can be sent to the second address or not be sent at all.

In an embodiment of the invention, one or more of the first address, the second address and the third address are specified to the participant device 305. For example, a SIP message is sent to the participant device 305 that includes one or more of the first address, second and third address. The SIP message may comprise one or more addresses in the session description part of the message using the Session Description Protocol (SDP). The SIP message may further comprise addresses in SIP headers. In an embodiment of the invention, the controller-processor 335 may send the SIP message to the participant device 305.

In various embodiments of the invention, where the session may be a dispatch call or a conference session, the RTCP packets comprise uplink talker arbitration messages. The uplink talker arbitration message may be used by the participant device 305 to request and release the privilege to be the talker in the session. Further, the second address, hosted by the application controller 320, is configured to receive the uplink talker arbitration message. The second RTCP packets may further comprise quality feedback information. In this case, the participant device 305 may also send second RTCP packets related to the quality feedback information to the second address. Alternatively, the participant device 305 may also send the second RTCP packets related to quality feedback information to a third address. As a result, the IP system 300 may specify different addresses for RTCP packets related to uplink talker arbitration messages and for RTCP packets for quality feedback information.

In embodiments where a plurality of devices of the IP system 300 host a multicast address to receive and send RTP packets, the participant device 305 may also receive third RTCP packets comprising a downlink talker arbitration message on the first address. Such a downlink talker arbitration message may be sent by the application controller 320 of the session. In this case, the first address is a multicast address. Further, where the first address is a multicast address, the participant device 305 may send uplink talker arbitration messages to the first address, to be received by another participant device. This uplink talker arbitration message may comprise an indication that the participant device 305 is releasing the privilege to speak. The method by which the application controller 320 learns that the participant device 305 is releasing the privilege to speak will be apparent to a person ordinarily skilled in the art.

In one embodiment, the participant device sends an explicit, additional message to the application controller 320. In another embodiment, some entity which is part of the multicast group, such as the replicator 330 could detect the talker arbitration message and can then forward the talker arbitration message to the application controller 320. In a third embodiment, a multicast address may be used that is different from the first address. In this case, the application controller 320 would be part of the second multicast group, but not the first. This may be advantageous for sending uplink talker arbitration messages because they would not only be received by the application controller 320 but also by the other participating devices.

The second address may be hosted by the application controller 320, and the downlink talker arbitration message is sent by the application controller 320 based on the one or more uplink talker arbitration messages received by the application controller 320 from the participant device 305. The first address may be a unicast address of a replicator 330. In this embodiment of the invention, the replicator 330 replicates some or all of the talker arbitration messages. Also, the replicator 330 hosts the second address for the downlink talker arbitration messages. The replicator 330 may send a copy of the downlink talker arbitration messages to one or more participant devices or to each participant device participating in the session. A downlink talker arbitration message can, for example, be in indication that the floor has been granted to a specific participant device. In various embodiments of the invention, another downlink talker arbitration message is sent to one or more specific participant device, where the participant device may host a fourth address. As a result, the fourth address is different for each participant device.

In an embodiment of the invention, the one or more other downlink talker arbitration messages that are sent to the fourth address may indicate to the participant device 305 that hosts a fourth address that the participant device 305 has obtained the privilege to speak, that the participant device 305 has been refused that privilege, or that the participant device 305 should leave the session. Further, the replicator 330 may forward uplink talker arbitration messages to the application controller 320, where the uplink talker arbitration messages are received from one or more other participant devices.

Figure 5A:
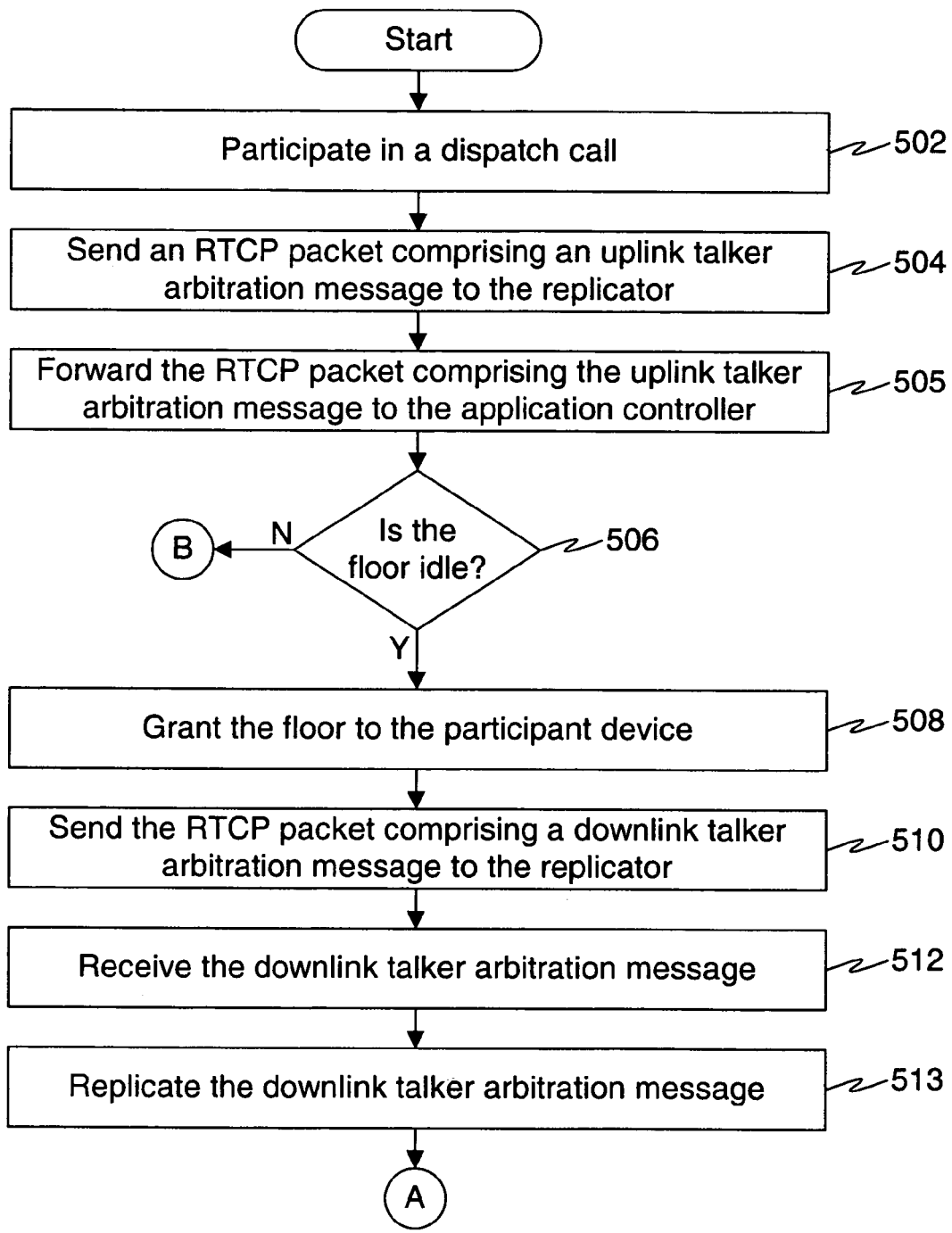
FIGS. 5A and 5B show a flow diagram of a method for transmitting data in a session in an IP system, in accordance with an embodiment of the invention.
Figure 5B:
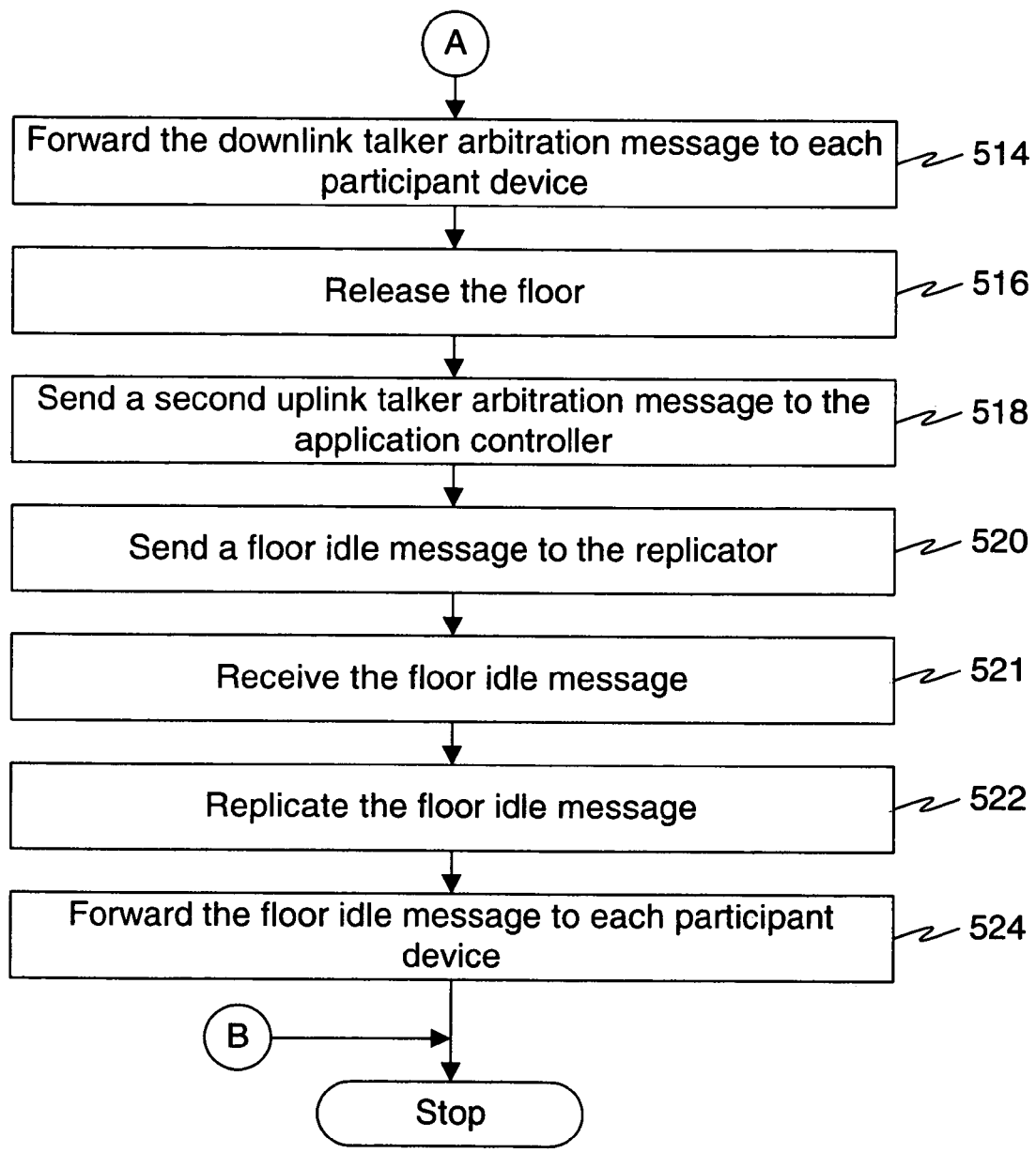

FIGS. 5A and 5B show a flow diagram of a method for transmitting data in a session in the IP system 300, in accordance with an embodiment of the invention. The participant device 305, the participant device 310 and the participant device 315 participate 502 in a dispatch call or a conference session. An RTCP packet comprising an uplink talker arbitration message is sent 504 by the participant device 305 to the replicator 330 to request the floor. The replicator 330 forwards 505 the RTCP packet comprising the uplink talker arbitration message to the application controller 320 requesting the floor. The application controller 320 then determines 506 whether the floor is idle. If the floor is idle, the application controller 320 grants 508 the floor to the participant device 305. If the floor is not idle, then the request is not granted. The application controller 320 then sends 510 the RTCP packet comprising a downlink talker arbitration message to the replicator 330. The replicator 330 receives 512, replicates 513 and forwards 514 the downlink talker arbitration message to each participant device 305, 310 and 315, for example, to indicate to the participant devices that the participant device 305 has the floor. The participant device 305 may then send RTP packets to the replicator 330. The replicator 330 replicates the RTP packets and the base station 325 forwards the replicated RTP packets to the participant device 310 and 315. At some moment during the call, the participant device 305 releases 516 the floor and sends 518 a second RTCP packet comprising a second uplink talker arbitration message to the application controller 320. The method of releasing the floor will be apparent to a person ordinarily skilled in the art.

Based on the second uplink talker arbitration message, the application controller 320 sends 520 a floor idle message to the replicator 330. The replicator 330 receives 521, replicates 522 and forwards 524 the floor idle message to each participant device 305, 310 and 315. So, the participant device 310 and/or participant device 315 may then request for the floor from the application controller 320 by performing the method discussed above.

The various embodiments of the invention provide a method and system that enables a participant device to send the RTP packets and the RTCP packets to separate addresses. As a result, it reduces the load on the IP system and the different application controllers.

The various embodiments of the invention provide a method and system that provides a consistent connectivity to the participant devices. The connectivity is also maintained when the participant device is moving from one radio access network technology to another during the call, if the participant device is a dual mode. For example, Integrated Digital Enhanced Network (iDEN) and Orthogonal Frequency Division Multiplexing (OFDM) device or Integrated Digital Enhanced Network (iDEN) and Code Division Multiple Access (CDMA) device. The method may be used without any changes or with minor changes made to the participant device.

By sending the RTP packets and the RTCP packets to separate addresses, embodiments of the present invention provide different possibilities for routing bearer messages, uplink arbitration messages and downlink arbitration messages as described in more detail below. For example, bearer messages can be sent to a unicast address of a replicator that would then send copies of the bearer to other participant devices. Bearer messages can also be sent to a multicast address, which then provides the bearer message to other participants. Alternatively, a participant device can copy and send bearer messages to each participant device individually.

Uplink arbitration messages can be sent to a unicast address of an application controller. Alternatively, the uplink arbitration message can be sent to the unicast address of a replicator that then forwards the message to the application controller. In yet another example uplink arbitration messages can be sent to a different multicast address that would be used by the application controller.

For downlink arbitration messages, the application controller can send individual message copies to each participant device. The application controller can also send a single message to the unicast address of a replicator that would then forward individual message copies to each participant device or send to a multicast address. The application controller can also send a downlink arbitration message to yet a different multicast address used for arbitration messages.

In the foregoing specification, specific embodiments of the present invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for transmitting data from a participant device in a session in an Internet Protocol (IP) system, the method comprising:
    sending at least a first Real-time Transport Protocol (RTP) packet of the session to a first address wherein the at least a first RTCP packet comprises an uplink talker arbitration message; and
    sending at least a first Real-time Transport Control Protocol (RTCP) packet of the session to a second address configured to receive the uplink talker arbitration message, the at least a first RTP packet and the at least a first RTCP packet being sent by the participant device.

2. The method of claim 1, further comprising sending at least a second RTCP packet of the session to a third address, the at least a second RTCP packet comprising a quality feedback information and the at least a second RTCP packet being sent by the participant device.

3. The method of claim 1, further comprising sending at least a second RTCP packet of the session to the second address, the at least a second RTCP packet comprising quality feedback information and the at least a second RTCP packet being sent by the participant device.

4. The method of claim 1, further comprising sending at least one third RTCP packet comprising a downlinik talker arbitration message to the first address, wherein the downlink talker arbitration message is sent by an application controller of the IP system.

5. The method of claim 4, wherein the second address is on the application controller, and the downlinik talker arbitration message is sent by the application controller based on the at least one uplinik arbitration message.

6. The method of claim 4, further comprising sending the downlinik talker arbitration message to at least one participant device, the downlinik talker arbitration message being sent by a replicator in the IP system, wherein the replicator hosts the first address.

7. The method of claim 4, further comprising sending at least one other downlinik talker arbitration message to at least one fourth address wherein a participant device hosts a fourth address.

8. The method of claim 1, wherein the first address is a multicast address.

9. The method of claim 1, wherein the first address is a unicast address of a replicator in the IP system.

10. The method of claim 1, further comprising sending the uplinik talker arbitration message to a replicator and the replicator sending the uplinik talker arbitration message to an application controller.

11. The method of claim 1, further comprising specifying the first address and the second address to the participant device.

12. The method of claim 11, wherein the specifying comprises sending a Session Initiation Protocol (SIP) message to the participant device, the message including the first address and the second address.

13. A participant device (PD) of an Internet Protocol (IP) voice system, the participant device comprising:
   a PD-processor, the PD-processor being configured to:
      send at least a first Real-time Transport Protocol (RTP) packet of a session to a first address, wherein the at least first RTCP packet comprises an uplinik talker arbitration message; and
      send at least a first Real-time Transport Control Protocol (RTCP) packet of the session to a second address configured to receive the uplink talker arbitration message.

14. The participant device of claim 13 where the participant device is a mobile station comprising a transmitter, the transmitter being adaptively coupled to the PD-processor.

15. The participant device of claim 13, wherein the first address is a multicast address.

16. The participant device of claim 13, where the PD-processor is further configured to receive the first and the second address in a Session Initiation Protocol (SIP) message.

17. A replicator of an Internet Protocol (IP) voice system, the replicator comprising
   a replicator-processor, wherein the replicator-processor is configured to:
      receive a plurality of uplinik packets for a session from a participant device and at least one downlinik packet for the session from an application controller, the plurality of uplinik packets comprising at least a first Real-time Transport Protocol (RTP) packet and at least a first Real-time Transport Control Protocol (RTCP) packet, the at least one downlinik packet comprising a downlinik talker arbitration message;
      replicate the at least a first uplinik RTP packet and the at least one downlinik packet; and
      send the at least a first RTCP packet to the application controller.

18. The replicator of claim 17, wherein the replicator-processor is configured to:
   receive the at least a first RTCP packet and the at least one downlink packet as a unicast message.

19. The replicator of claim 18, wherein the replicator-processor is configured to replicate the at least a first RTP packet and the at least one downlinik packet to a plurality of participant devices.

20. An Internet Protocol (IP) system comprising:
   at least one participant device (PD), the at least one participant device comprising:
      a transmitter; and
      a PD-processor, the transmitter being coupled with the PD-processor, wherein the PD-processor is configured to:
         send at least a first Real-time Transport Protocol (RTP) packet of a session to a first address; and
         send at least a first Real-time Transport Control Protocol (RTCP) packet of the session to a second address; and
   an application controller, the application controller hosting the second address, the application controller comprising:
      a controller-processor, wherein the controller-processor is configured to send at least one downlinik talker arbitration message to at least one of the first address and the at least one participant device.

21. The IP system of claim 20, wherein the participant device is a mobile station, wherein the controller-processor is configured to send at least one downlinik talker arbitration message to at least one of the first address and the at least one participant device via a base station.

22. The IP system of claim 20, wherein the controller-processor is further configured to specify the first address and the second address to the at least one participant device.

23. The IP system of claim 20, wherein the first address is a multicast address.

24. The IP system of claim 20, further comprising:
   a replicator, the replicator hosting the first address, the first address being a unicast address, the replicator comprising a replicator-processor, wherein the replicator-processor is configured to:
      receive a plurality of uplinik packets for the session from a participant device and at least one downlinik packet for the session from the application controller, the plurality of uplinik packets comprising the at least a first Real-time Transport Protocol (RTP) packet, the at least one downlinik packet comprising the at least one downlinik talker arbitration message; and
      replicate the at least a first RTP packet and the at least one downlinik packet.

25. The IP system of claim 24, wherein the plurality of uplinik packets further comprises the at least a first Real-time Transport Control Protocol (RTCP) packet, wherein the replicator-processor is further configured to send the at least a first uplink RTCP packet to the application controller.

* * * * *